L. J. WOGENSTAHL.
DIRIGIBLE HEADLIGHT.
APPLICATION FILED APR. 24, 1914.
1,256,414. Patented Feb. 12, 1918.
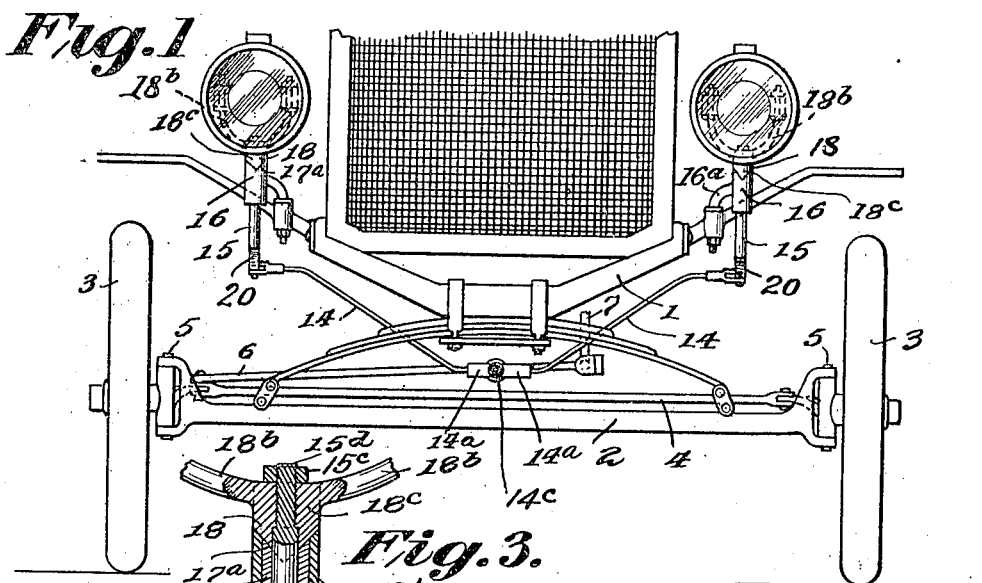
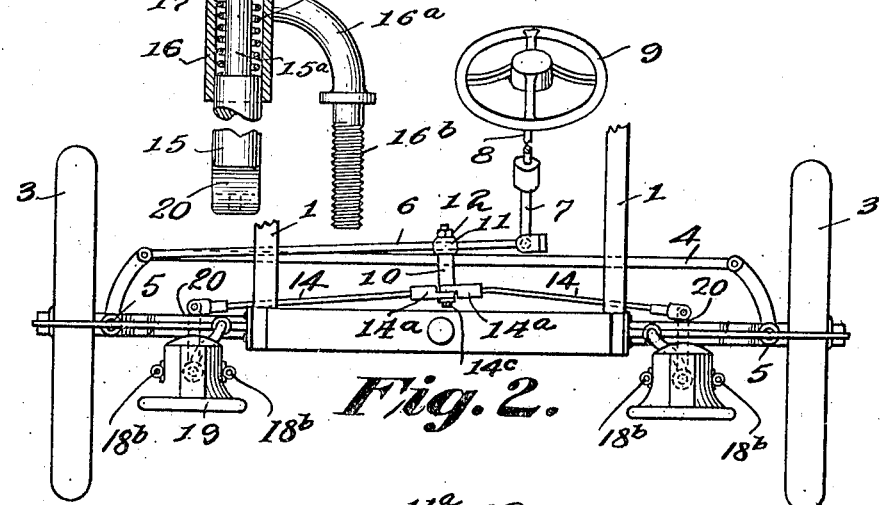
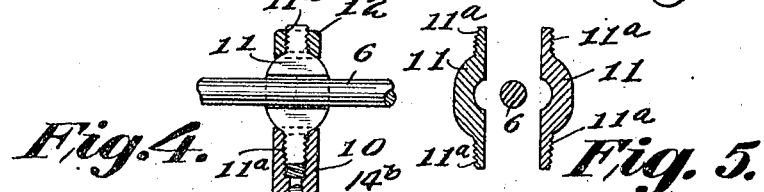

UNITED STATES PATENT OFFICE.

LEO J. WOGENSTAHL, OF SAN ANTONIO, TEXAS, ASSIGNOR TO AUTOMATIC SEARCH LIGHT COMPANY, OF PHOENIX, ARIZONA, A CORPORATION OF ARIZONA.

DIRIGIBLE HEADLIGHT.

1,256,414.     Specification of Letters Patent.     Patented Feb. 12, 1918.

Application filed April 24, 1914. Serial No. 834,227.

*To all whom it may concern:*

Be it known that I, LEO J. WOGENSTAHL, a citizen of the United States, residing at San Antonio, in the county of Bexar and State of Texas, have invented certain new and useful Improvements in Dirigible Headlights, of which the following is a specification, reference being had therein to the accompanying drawing.

One of the objects of the invention is to provide an improved lamp bracket having means tending to automatically effect centering and prevent vibration. Another object of the invention is to provide in a mechanism of the sort referred to improved connecting devices between the lamp brackets and the steering mechanism of the automobile. Another object is to provide a general improved arrangement and construction of the parts of a mechanism of this class.

Referring to the drawings—

Figure 1 is a front view of an automobile having attached thereto devices embodying my invention.

Fig. 2 is a plan view of some of the parts shown in Fig. 1.

Fig. 3 is an enlarged sectional view taken through one of the lamp brackets.

Fig. 4 is a fragmentary sectional view showing the means for connecting the lamp controlling devices to the automobile steering mechanism.

Fig. 5 is a fragmentary view showing in detail some of the parts illustrated in Fig. 4.

In the drawings I have shown some of the parts at the front end of an automobile, they being sufficient to illustrate the manner of applying my invention to the lamp system of such a vehicle. It is unnecessary to describe in detail, parts of the automobile proper, it being sufficient to say that 1 indicates the front bolster or cross sill part that supports the front end of the vehicle body; and that 2 indicates the front axle upon which the sill 1 and the body bear through the interposed transverse front springs. 3, 3 are the front wheels which are carried in more or less the usual way by means of the stud spindles each on a bell lever or a knuckle carrier pivoted at 5. The rearward projecting arm of each lever or knuckle is connected with the other by means of the cross rods 4 pivoted to each.

6 indicates the link or pitman which transmits the pull or thrust from the manual steering devices to the wheel spindles, so as to rock them in horizontal planes in steering in the usual way. This steering rod or link 6 extends from one side part way across the mechanism, and its inner end is adapted to vibrate vertically in relation to the axle. The steering shaft is indicated by 7. It is mounted in the post 8 and is provided with a hand wheel 9 accessible to the driver.

10 is a sleeve or tube which is tightly secured to the link or pitman 6 by means of a clamp having the half sleeves 11 which are attached to the pitman near its inner end. Each of these has at each side of its center a projecting section 11$^a$. The exterior surface of each of these sleeve sections is tapered and the two sections have registering tapering threads. The sleeve 10 at its rear end has an internal tapering thread which engages with the sleeve halves 11$^a$ on the front side of the clamp, and on the rear side use is made of a nut 12, also provided with an internal tapering thread. When the sleeve 10 and the nut 12 are forced tightly to place they bind the clamp halves 11 tightly to the rod 6 and serve to prevent slippage in either direction along the rod.

The other end of the sleeve 10 is pivotally connected to the two lamprods 14. Each of these, at its inner end, has a pivot piece 14$^a$, each of which is rabbeted and apertured, as shown at 14$^b$. A pivot pin or bolt 14$^c$ passes through the two rabbeted parts of the pivot pieces and engages with the sleeve 10.

The rods 14, at their outer ends, are pivoted to the lower ends of the shafts or spindles 15, which carry the brackets and lamps. Each of these is carried by a stationary tubular standard 16 having an arm 16$^a$ rigidly secured by the threaded part 16$^b$ to a suitable part of the main frame. The upper part of each tubular standard is shaped to provide a sharp V-shaped socket or recess. The upper part of the standard has a central cylindrical aperture. The vertical shaft or spindle 15 has its upper part reduced in diameter as shown at 15$^a$, this part passing through the central aperture in the standard. 15$^b$ is a spring interposed between the shoulder in the bracket at 17 and the shouldered lower part of the shaft 15. Preferably there is a plug-like block fastened in the upper end of the standard tube to provide the shoulder at 17 and also to provide the sharply cut V-shaped socket or recess at the upper end of the stem. The upper end part of the shaft 15 is still further reduced and threaded as at 15$^d$. The lamp bracket 18 has the fork arms 18$^b$ to which the lamp is secured in any preferred way. At the lower ends these arms are integral with, or rigidly secured to, a central boss part 18$^c$, which has a central vertical aperture. The upper part 15$^a$ of the spindle 15 passes through this aperture and the spindle is rigidly secured to the bracket by means of the nut 15$^e$.

The lower edge of the hub part 18$^e$ is formed to have bottom surfaces which converge downward at a sharp angle corresponding to the recess at 17$^a$ in the upper end of the standard.

A spring 15$^b$ tends to hold the convex bottom part of the hub 18$^e$ snugly in the V-shaped recess, but upon the application of power to the spindle retention of the spring is overcome sufficiently to permit the bracket to be turned.

At the lower end of the spindle 15 there is a crank arm 20 extending outward to a point suitable for pivotal attachment to the above described rods 14.

The crank arms at the lower ends of the lamp spindles are preferably carried to points somewhat behind the axial vertical plane of the axle; and the vertical axes of the lamps are brought back so as to be positioned as near as possible to the same plane. This arrangement brings the vertical axes of the outer ends of the operating rods 14 near to the vertical plane of the axis of the pivot which connects them to the hinging device at 10.

What I claim is:

1. In a vehicle of the class described, the combination of the lamps, the lamp stems, the seats for the stems holding the lamps substantially rigidly against rotation when in normal position, and the vertically vibrating steering rod, of the lamp-operating rods pivotally connected to the steering rod near its vibrating end and connected to the lamp stems at points near the transverse vertical plane of their connection with the steering rod, substantially as set forth.

2. In a vehicle of the class described, the combination with the lamps adapted to swing on vertical axes, the lamp-rotating crank arms, and the vertically vibrating steering rod for transmitting steering movement to the wheels, of the hinge device secured adjustably to the steering rod near its vibrating end, and the lamp-operating rods pivoted to the hinge device and pivotally connected to the lamp cranks at points approximately in the vertical plane of their connection to the hinge device.

3. The combination with the frame, the front wheels and the steering mechanism of an automobile, of two lamp-carrying spindles mounted on opposite sides of the frame for oscillation about vertical axes; operating arms secured to the spindles, a clamp engaging a movable rod of the steering mechanism and comprising two half-sleeves each provided with opposite tapering threaded half-sections, the threads of the corresponding half sections of the two half-sleeves registering, a sleeve having internal tapering threads which engage the threads of one pair of half-sections, a nut having tapering threads engaging the other pair of half sections, and connections between said sleeve and the operating arms on the spindles.

4. The combination with the frame of an automobile, the front wheels and the steering mechanism having a substantially horizontal transverse operating rod, of two lamp-carrying spindles mounted on opposite sides of the frame for oscillation about vertical axes, operating arms secured to the spindles, a centrally located clamp engaging the said operating rod of the steering mechanism and comprising two half-sleeves each provided with opposite tapering threaded half-sections, the threads of the corresponding half sections of the two half-sleeves registering, a sleeve extending forward from the rod having internal tapering threads which engage the threads of one pair of half-sections, a nut having tapering threads engaging the other pair of half sections, and transverse links pivotally connected at their inner ends to the said sleeve and at their outer ends to the operating arms on the spindles.

In testimony whereof I affix my signature in presence of two witnesses.

LEO J. WOGENSTAHL.

Witnesses:
I. M. McILHENNY,
R. C. WADE.